(12) United States Patent
Bauerle et al.

(10) Patent No.: US 7,305,295 B2
(45) Date of Patent: Dec. 4, 2007

(54) THROTTLE LIMITING FOR AN INTERNAL COMBUSTION ENGINE

(75) Inventors: Paul A. Bauerle, Fenton, MI (US); Kerfegar K. Katrak, Fenton, MI (US); Barbara A. Shuler, Brighton, MI (US); Patrick J. O'Leary, Clinton Township, MI (US)

(73) Assignee: General Motors Corporation, Detroit, MI (US)

( * ) Notice: Subject to any disclaimer, the term of this patent is extended or adjusted under 35 U.S.C. 154(b) by 608 days.

(21) Appl. No.: 10/831,335

(22) Filed: Apr. 23, 2004

(65) Prior Publication Data

US 2005/0240333 A1    Oct. 27, 2005

(51) Int. Cl.
*B60K 31/00* (2006.01)
*F02P 5/02* (2006.01)
*B60T 8/32* (2006.01)

(52) U.S. Cl. .............................. 701/93; 701/85; 701/86; 123/352; 123/683; 180/170; 180/335

(58) Field of Classification Search ............ 701/51–56, 701/93, 84–86; 180/335, 336, 170; 477/206–207; 123/41.07, 319, 328, 681, 683
See application file for complete search history.

(56) References Cited

U.S. PATENT DOCUMENTS

| 4,531,489 A | * | 7/1985 | Sturdy ........................ 123/320 |
| 4,675,827 A | * | 6/1987 | Narita et al. .................... 701/50 |
| 5,894,724 A | * | 4/1999 | Minowa et al. ................ 60/274 |
| 6,073,610 A | * | 6/2000 | Matsumoto et al. ......... 123/396 |

* cited by examiner

*Primary Examiner*—Yonel Beaulieu (57) ABSTRACT

A throttle limit control for an internal combustion engine throttle control is disclosed. Rate limiting is applied to prevent excessive rates of change in throttle actuation. Throttle pedal authority is continually maintained and throttle headroom is not compromised thereby. Application to various systems including conventional and adaptive cruise systems and power take-off systems is envisioned.

24 Claims, 7 Drawing Sheets

THROTTLE LIMITING FOR AN INTERNAL COMBUSTION ENGINE

TECHNICAL FIELD

The present invention is related to automotive throttle control systems. More particularly, the present invention is concerned with throttle limiting in a variety of cruise control and power take-off mechanizations.

BACKGROUND OF THE INVENTION

Cruise control systems are employed extensively in modern automobiles. Conventional cruise control systems regulate vehicle speed to a an operator set speed in accordance with well known PID speed controllers. Adaptive cruise control systems are also known wherein the following distance of an adaptive cruise vehicle relative to a preceding vehicle is controlled. The following distance may be a set distance or a variable distance as a function of vehicle speed. Vehicle separation may be determined, for example, by radar, infrared, ultrasonic or other means.

Speed control or following distance of such conventional or adaptive cruise control equipped vehicles ultimately depends upon the control of drive torque produced by the vehicle. In internal combustion engines, torque is generally a function of the air ingested by the cylinders (intake air) among other factors. Intake air is controlled by throttling an air passage upstream of the cylinders.

Vehicular power take-off (PTO) systems are known which provide for a mechanical output from an internal combustion engine or portion of the vehicle drivetrain to drive accessory loads such as electrical generators or mechanical or hydraulic apparatus. PTO is operator invoked generally in accordance with a selected engine speed setting. Speed control of the engine ultimately depends upon the engine torque required to provide the needed PTO torque requirements at the selected set speed. As previously stated torque is generally a function of intake air ingested by the internal combustion engine. And, intake air is controlled by throttling.

Mechanically linked throttle systems are known wherein intake air is throttled in substantial accordance with the throttle pedal position under control of the vehicle operator. Such mechanically linked systems similarly employ mechanically linked throttle actuators to establish position authority over the throttle valve for cruise control and PTO applications—typically by a valve controlled vacuum actuator and cabled arrangement. Electronic throttle control systems are known which mechanically decouple the throttle valve from the throttle pedal. Such systems generally employ throttle pedal position sensing and stepper motor actuation of a throttle valve. Throttle valve position sensing is also generally employed in both mechanically linked and electronically controlled throttle systems.

Throttle authority is conventionally set to an upper limit of substantially 100% (fully open) when a cruise control or PTO system is activated. It is generally desirable to provide for broad throttle authority during cruise control since vehicle throttle requirements can vary substantially with load, grade and altitude. It is known in cruise systems, for reasons including driveability considerations, to provide a throttle limit during resume and acceleration cruise operations. Such limits are known to be substantially fixed throttle position settings and may be a setting substantially in excess of a current throttle position.

Such broad limits on throttle authority may in the event of certain control corruption necessitate operator intervention in order to manage the throttle as desired to maintain the operator's objective of vehicle speed or following distance in a cruise control mode or engine speed in a PTO mode. Generally, however, it is desirable to minimize the amount of operator interaction that is required, even in the event of a control corruption. Therefore, a need exists to limit the required operator intervention required in the event of control corruption while at the same time not unnecessarily limiting throttle authority.

SUMMARY OF THE INVENTION

A vehicle includes a throttle controlled internal combustion engine. In accordance with one aspect of the present invention, throttle changes are controlled by providing a throttle actuation limit substantially corresponding to a throttle pedal angle and providing a requested throttle actuation corresponding to an automated throttle position control such as conventional or adaptive cruise or power take-off. Throttle rate of change is limited when the requested throttle actuation is above the throttle actuation limit.

In accordance with another aspect of the present invention, a method for controlling a throttle in an internal combustion engine includes providing a first throttle actuation request substantially corresponding to a throttle pedal angle. A second throttle actuation request corresponding to an automated throttle position control is likewise provided such as from a conventional or adaptive cruise control system of a power take-off system. Throttle changes are effected substantially in accordance with the first throttle actuation request when said first throttle actuation request exceeds the second throttle actuation request. Throttle changes are rate limited when the first throttle actuation request does not exceed the second throttle actuation request.

Generally, the automated control maintains authority over the throttle position when the requests therefrom are within expected ranges as exemplified in the chosen calibrations for the rate limiting. Only when excessive rates of throttle change are being requested will the rate limiting affect the system. And even then, throttle changes are generally permitted up to the full authority of the throttle control. Exceptions are envisioned such as when continued throttle changes result in errors in other affected controlled operating parameters such as vehicle speed in a conventional set speed cruise control system. Throttle pedal authority is always provided such that operator requests—as discerned from throttle pedal actuations—in excess of the requests from the automated throttle position controls take precedence.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
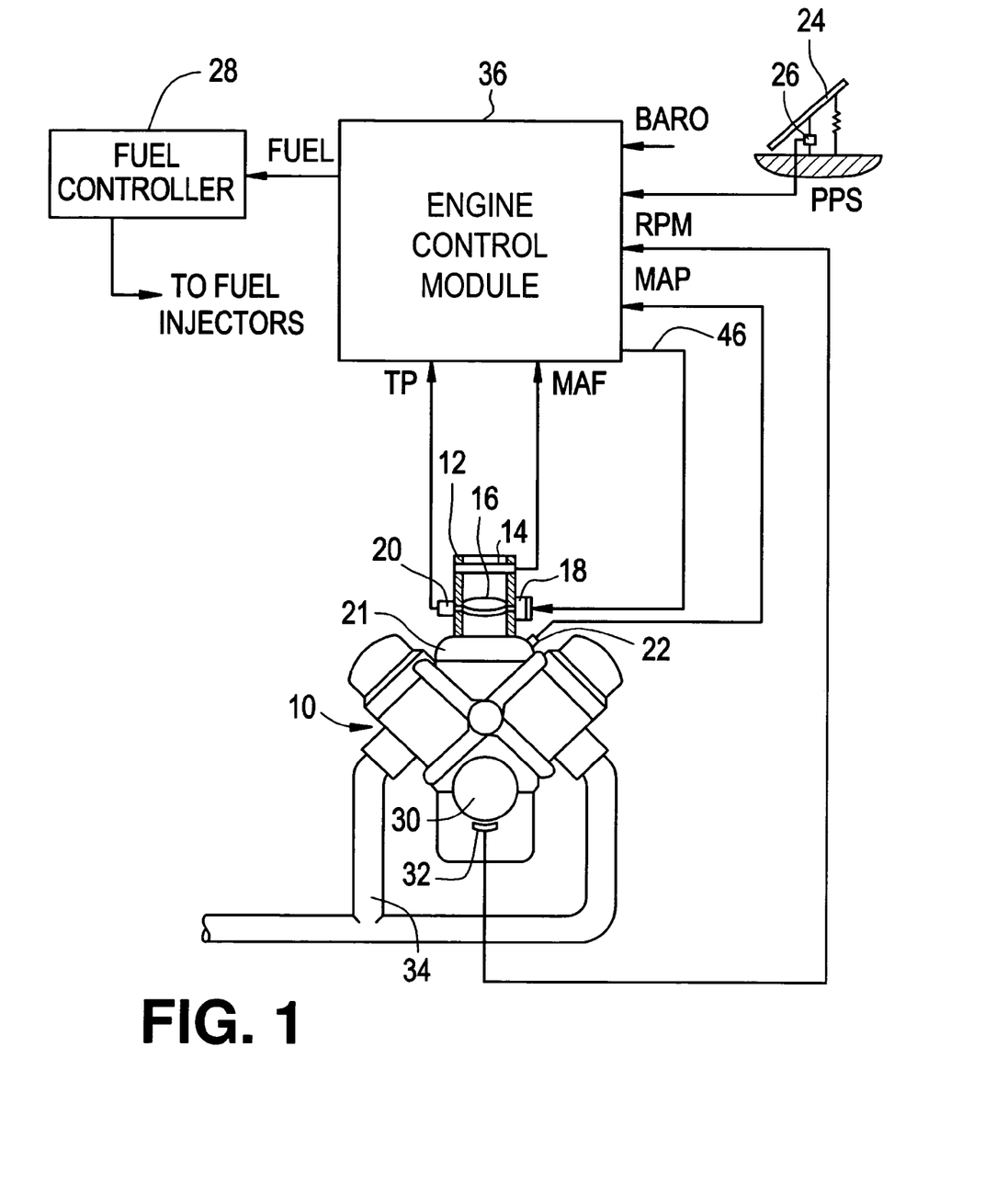
FIG. 1 is a block diagram of an exemplary automotive internal combustion engine and controller implementation of the present invention.

Reference is now made to the figures and particularly beginning with FIG. 1 an engine control module (ECM) 36 is a microcontroller based device with standard control and logic circuitry and standard memory devices including read only memory devices in which are stored a plurality of routines for carrying out engine control and diagnostic operations. Each routine includes a sequence of instructions which are executed by the microcontroller following preestablished engine events or on a timed basis. Such routines, which may be repeatedly executed following each successive engine cylinder event while the engine is operating, include fuel control and spark timing routines for generating and issuing a fuel command FUEL and a spark timing command EST, respectively. These commands are provided to respective fuel controllers and ignition controllers (not separately illustrated) for controlling fuel delivery and ignition timing for each cylinder event.

An operator-controlled accelerator pedal 24, a.k.a. throttle pedal, is manually depressed by a vehicle operator to indicate a desired engine operating level. The degree of depression of the pedal away from a rest or low angle position is transduced by conventional potentiometric position sensor 26 into output signal PPS, which is provided as a control input to ECM 36 as an indication of a desired engine operating level. Throttle actuation and throttle position sensing is accomplished by electronic throttle body throttle actuation hardware and throttle position sensing hardware (ETB & TPS) 131 as follows. An intake air valve position command is converted into a pulse width modulated (PWM) actuator drive signal on line 46 for commanding output shaft of actuator 18 toward a desired rotational position. Intake air valve position signal TP is received by the ECM 36 for closed-loop control operations. Alternatively, a separate throttle control module (not shown) includes a conventional controller architecture of such well-known elements as a central processing unit and input/output circuitry. Generally, the throttle control module receives engine operating condition information from the ECM 36 across a bi-directional serial data link, and receives transducer signals and generates, through execution of a series of stored instructions in the form of a control routine, an intake air valve position command (i.e. actuator drive current signal) for commanding output shaft of actuator 18 toward a desired rotational position. In such arrangement, signal TP is received by the throttle control module for closed-loop control operations.

Intake air is passed through intake air bore 12 past mass airflow meter 14 of the thick film or hot wire type for transducing engine intake air mass flow rate into output signal MAF. An electronically-controlled intake air valve 16 for example of the butterfly or rotary type is disposed in intake air bore 12 and rotates therein to vary a degree of restrictiveness of the intake bore 12 to intake air passing therethrough. An electromechanical actuator 18, for example of the DC motor or stepper motor type includes a rotatable output shaft (not shown) mechanically linked to the valve 16, such as through a gear assembly (not detailed). The rotational position of the output shaft of actuator 18 is controlled through variation in an electrical current command issued by ECM 36, for example through pulse width modulation control of the four gates of a commercially available full H-bridge (not shown) for bi-directional current control. Through timed variation in the magnitude of the current command, high resolution, highly responsive control of engine intake air valve position is provided for engine intake air rate control. Actuator 18 may be any commercially-available high performance electromechanical actuator that provides high performance dynamic positioning, as is well-established as required in electronic throttle control applications under certain engine operating conditions, such as high engine intake air rate (high engine load) operating conditions. The rotational position of the intake air valve 16 is transduced by potentiometric position sensor 20 of any conventional type into output signal TP.

The intake air passing across intake air valve 16 is received in an intake manifold 21 for distribution to intake runners of a plurality of engine cylinders (not shown). Intake air absolute pressure in the intake manifold 21 is transduced by conventional pressure transducer 22 into output signal MAP. Ambient barometric pressure is transduced by a conventional barometric pressure sensor (not shown) or, alternatively, under specified operating conditions, such as conditions in which the pressure drop across the intake air valve 16 is substantially zero, is set to the pressure value represented by signal MAP.

The intake air is combined with an injected fuel quantity and delivered to engine cylinders for combustion therein for reciprocally driving pistons (not shown) within the cylinders, the pistons being mechanically linked to an engine output shaft 30 to rotatably drive the output shaft. Engine position is transduced by a rotation sensor (EPS) 32, for example a conventional Hall effect or variable reluctance transducer, positioned in close proximity to the output shaft to transduce passage of encoded patterns of teeth or notches (not shown) formed on the output shaft into cycles of transducer output signal. From EPS 32 can be derived engine speed as conventionally practiced in the art of engine controls. Gasses produced in engine cylinders during the combustion process are guided out of the cylinders and through exhaust gas conduit 34.

The ECM 36 receives a plurality of input signals including the described transducer output signals MAF, MAP, EPS, and BARO, and, through execution of the described routines, generates command FUEL and command EST, and other control commands including for throttle valve positioning in accordance with an electronic throttle control and the method of the present invention.

Figure 2:
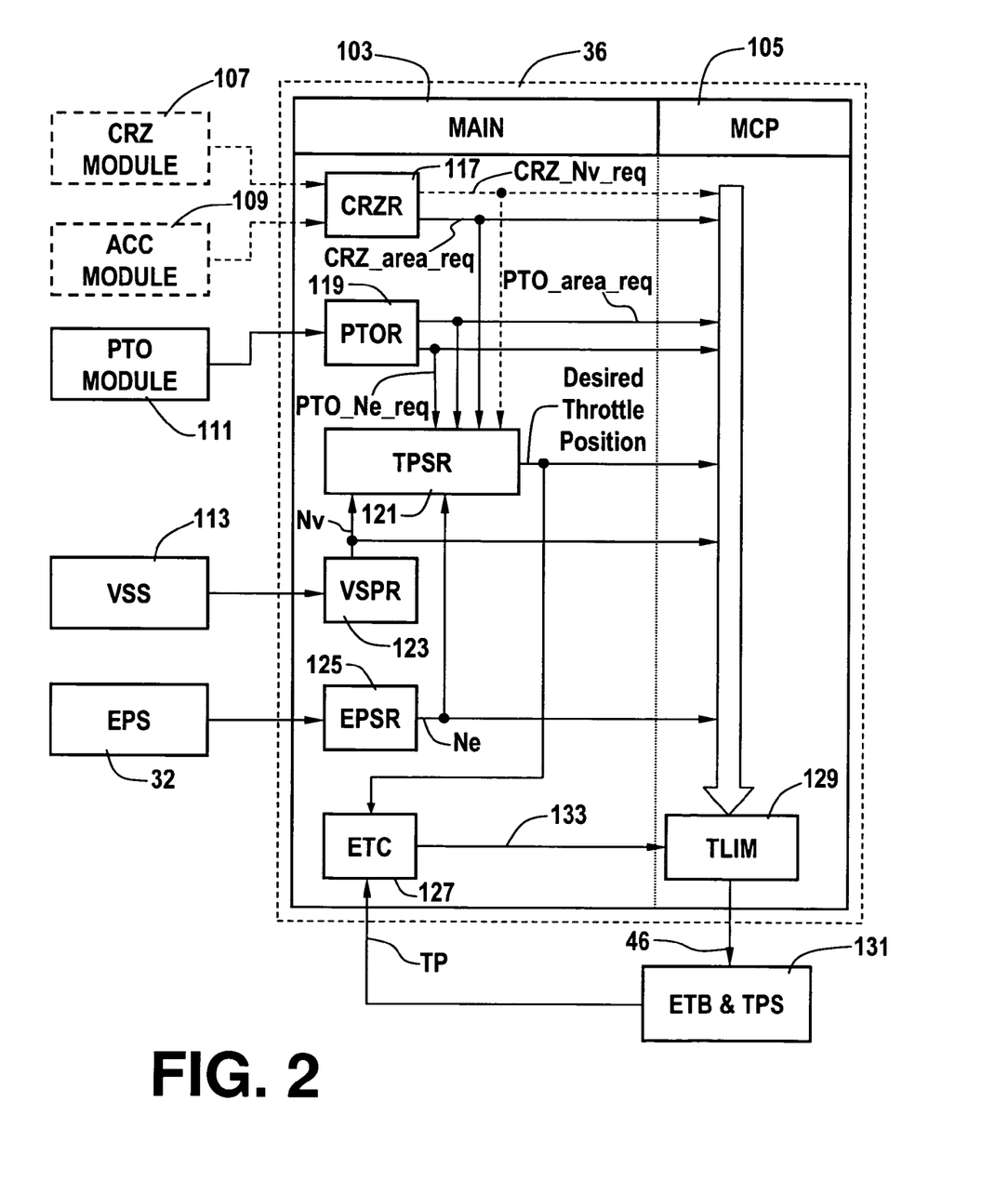
FIG. 2 is a controller block diagram of preferred engine control module for implementation of the present invention.

Reference is now made to FIG. 2 wherein a preferred controller architecture for implementing the various embodiments of the present invention is illustrated. ECM 36 is a microprocessor based controller comprising such common elements as read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In the exemplary embodiment, ECM 36 comprises a dual microprocessor system designated as the main control processor (MAIN) 103 and motor control processor (MCP) 105. MAIN and MCP provide, as previously described, a variety of control and diagnostic functions related to an internal combustion engine. ECM functions to directly acquire data from a variety of sensors and other electronic modules and directly control a variety of actuators to accomplish the engine control objectives, including throttle control in accordance with throttle pedal position, or automated throttle controls such as in adaptive and conventional cruise system and power take-off systems, including throttle limiting controls in accordance with the present invention. Inputs and outputs may be in the form of discrete data signals or via bussed or networked data exchanges with other modules. For example, a vehicle speed sensor (VSS) 113 provides a discrete signal corresponding to vehicle road speed as may be determined in accordance with a conventional rotation sensor providing a periodic signal proportional to vehicle speed. Such sensor may be positioned to sense rotation speed of the transmission output member or alternatively a vehicle speed signal can be determined from one or more discrete wheel speed sensors as well known in the art. Engine position sensor EPS 32 similarly provides a discrete signal as previously described.

Various other modules such as cruise module (CRZ) 107, adaptive cruise control module (ACC) 109 and power take-off module (PTO) 111 may interface with ECM via a controller area network (CAN) bus thus allowing for communication of control parameters and commands between the various modules. A preferred communication protocol for automotive applications is the Society of Automotive Engineers standard J1939. The CAN bus and appropriate protocols provide for robust messaging and multi-controller interfacing between the ECM, CRZ, ACC and PTO modules and other controllers such as antilock brake and traction controllers. ETB & TPS 131 is illustrated in block format but does, as described previously, include a throttle valve position actuator and throttle position sensor. CRZ and ACC modules are shown in broken line format indicating alternative application—that is cruise control would be implemented by one or the other module.

MAIN includes a variety of control modules shown in block format. These modules are functional modules and represent software routines for providing various specialized control and diagnostic routines as described further herein below.

Cruise control block (CRZR) 117 provides for vehicular cruise functionality and relies upon data from CRZ module 107 or ACC module 109. CRZ module 107 accepts a plurality of switch inputs such as ON/OFF, RESUME-SPEED/ACCELERATE, SET-SPEED/COAST, CANCEL AND BRAKE. CRZ module 107 monitors the switch states and their transitions, performing signal conditioning and pre-processing including conventional debouncing, and exchanges this data with CRZR 117 of the main control processor of ECM 36. CRZR receives data from CRZ module 107 and interprets appropriate cruise states and settings such as enabled or disabled, vehicle speed settings and incremental or ramped changes thereto. ACC module 109 accepts a plurality of switch inputs such as ON/OFF, RESUME/ACCELERATE, SET/COAST, CANCEL AND BRAKE. Additionally, ACC module may also receive an adjustable input such as from a potentiometric input setting adapted for use in establishing a variable setting for following distance. In an adaptive cruise system, the RESUME and SET switches may only effect their functions of establishing a following distance where there is an in-range preceding vehicle. ACC module 109 monitors the switch states and their transitions, performing signal conditioning and pre-processing including conventional debouncing, and exchanges this data with CRZR 117 of the main control processor of ECM 36. CRZR receives data from ACC module 109 and interprets appropriate cruise states and settings such as enabled or disabled, set following distance, resume to a set following distance, accelerate, etc.

Power take-off block (PTOR) 119 provides for vehicular power take-off functionality and relies upon data from PTO module 111. PTO module 111 accepts a plurality of switch inputs such as ON/OFF, SET1 and SET2. Actuation of SET1 and SET2 switches effect respective calibrated engine set speeds upon a first actuation, effect set speed increments and decrements, respectively, upon subsequent momentary actuations, and effect set speed ramping when actuated and held. PTO module 111 monitors the switch states and their transitions, performing signal conditioning and pre-processing including conventional debouncing, and exchanges this data with PTOR 119 of the main control processor of ECM 36. PTOR receives data from PTO module 111 and interprets appropriate power take-off states and settings such as enabled or disabled, engine speed settings and incremental or ramped changes thereto.

Vehicle speed block (VSPR) 123 receives discrete vehicle speed signal from VSS 113 as previously described. VSPR 123 provides conventional vehicle speed signal processing including signal conditioning and filtering of raw signal data and provides vehicle speed (Nv) for use in the engine control routines of the present invention.

Engine speed block (EPSR) 125 receives discrete engine rotation signal from engine rotation sensor EPS 32 as previously described. EPSR 125 provides conventional engine rotation signal processing including signal conditioning and filtering of raw signal data and provides engine speed (Ne) for use in the engine control routines of the present invention.

Cruise control block CRZR 117 provides a cruise throttle area request (CRZ_area_req) in accordance with the respective requests from CRZ module 107 or ACC module 109 embodied in the respective module switch states and transition data. CRZR 117 also provides, in the case of set speed control, a cruise vehicle speed request (CRZ_Nv_req). CRZ_area_req and CRZ_Nv_req are provided to throttle position control block (TPSR) 121 for use in the throttle control of the present invention. Power take-off block PTOR 119 provides a power take-off throttle area request (PTO_area_req) and power take-off engine speed request (PTO_Ne_req) in accordance with the request from PTO module 111 embodied in the PTO module switch states and transition data. PTO_area_req and PTO_Ne_req are provided to throttle position control block TPSR 121 for use in power take-off throttle and engine speed control of the present invention. Vehicle speed block VSPR 123 provides a vehicle speed signal Nv in accordance with the raw speed signals from VSS 113. Engine speed block EPSR 125 provides an engine speed signal Ne in accordance with the raw speed signals from EPS 32. Vehicle and engine speed signals Nv and Ne, respectively, are provided to throttle position control block TPSR 121 for use in various throttle controls as previously mentioned, including the throttle limiting controls of the present invention.

Throttle position control block TPSR processes the inputs described in establishing a desired throttle position signal which is provided to electronic throttle control block (ETC)

127. Electronic throttle control block also receives intake air valve position signal TP and, through closed-loop control, establishes a intake air valve position command signal on line 133. Intake air valve position command signal is provided to motor control processor where it is converted into a pulse width modulated (PWM) actuator drive signal. In accordance with a preferred implementation, however, intake air valve position command is scrutinized in accordance with a redundant implementation of the throttle control routine within throttle limit block (TLIM) 129 of the present invention as further described herein below. Further, in accordance with the preferred redundant implementation of the throttle control of the present invention, the described outputs from the main control processor MAIN blocks—i.e. CRZR, PTOR, TPSR, VSPR and EPSR—to wit, CRZ_Nv_req, CRZ_area_req, PTO_Ne_req, PTO_area_req, desired throttle position, Nv and Ne, are provided to the motor control processor MCP 105.

Figure 3:
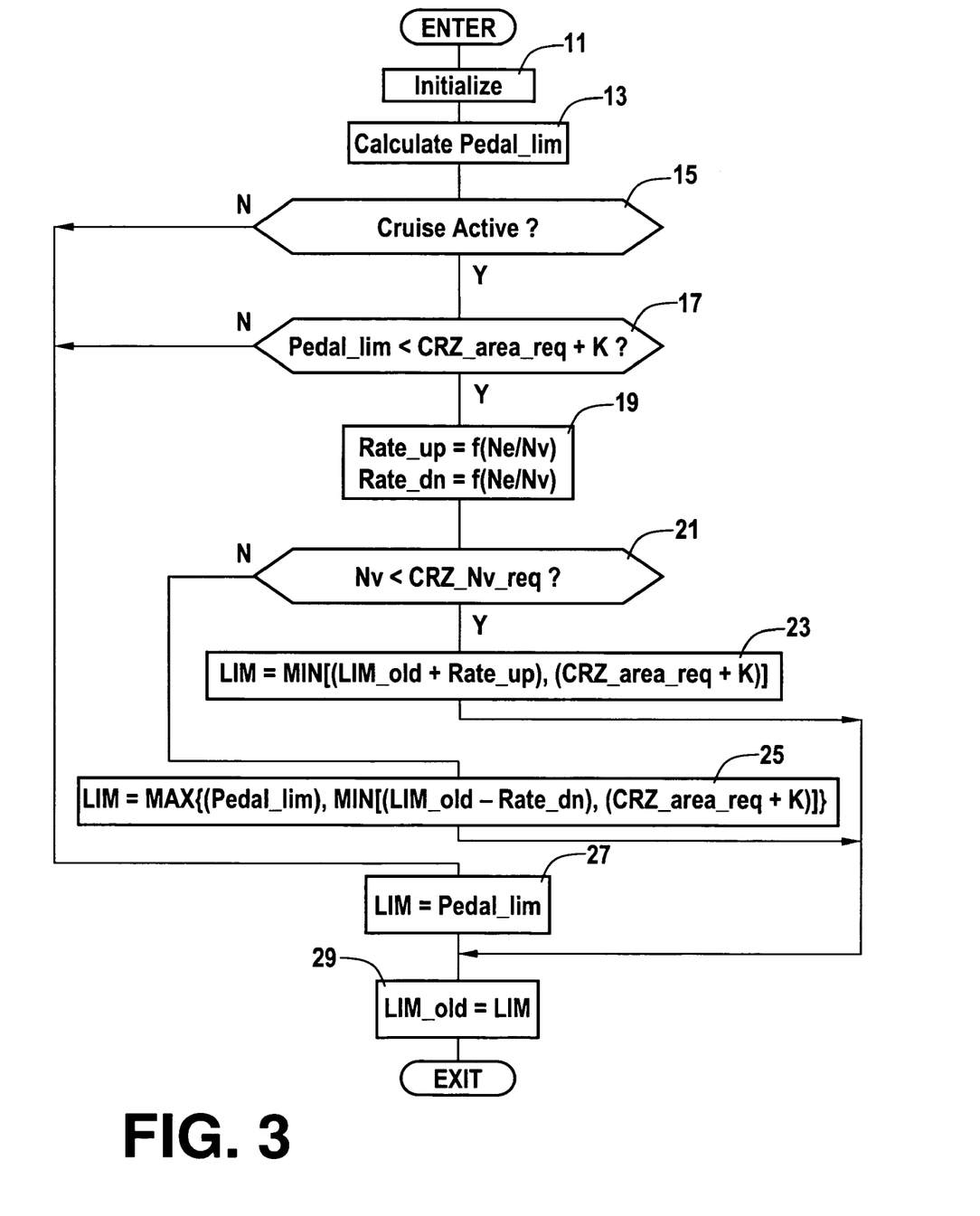
FIG. 3 is a flow diagram representing certain exemplary steps of a first embodiment of the present throttle control invention implemented as part of an automotive set speed cruise control system.

In addition to the conventional steps of determining the desired throttle position signal in accordance with the various cruise, adaptive cruise or power take-off requests, the present invention, in various embodiments to be described independently with respect to conventional cruise, adaptive cruise and power take-off controls, provides for throttle limiting functionality that generally rate limits throttle changes while maintaining throttle pedal authority when requested by the vehicle operator and otherwise does not limit throttle authority for the respective active control, e.g. cruise, adaptive cruise or power take-off. Turning now to FIG. 3 a routine representing program steps particularly related to the throttle control of the present invention as relates to a conventional cruise control system effective to control vehicle speed substantially to a set speed is shown. This routine, as well as all of the routines of the various embodiments to be described, is part of a much larger set of instructions utilized in the overall control and diagnosis of the engine. The routines are preferably executed in a loop such as upon a timer interrupt but may also be executed in other fashions such as by way of event based interrupts if appropriate. A loop time no greater than about 50 milliseconds will effect a smooth control that is transparent to the vehicle operator. In a preferred implementation, the loop is executed in a 12.5 millisecond loop.

Step 11 represents steps executed for the purposes of initializing various registers and variables. Certain of the steps may be executed upon power up only, or through the first interrupt only, for example to seed initial variable values. At step 13 a pedal based throttle limit (Pedal_lim) is calculated in accordance with the sensed throttle pedal position as invoked by the vehicle operator. Such Pedal_lim essentially follows the operator's actuation of the throttle pedal. The position transduced from the position sensor 26 (FIG. 1) is thereby used to establish Pedal_lim at some finite value in terms of throttle area. All throttle limits in this conventional cruise control embodiment, and in the adaptive cruise control and power take-off embodiments of this invention, are in terms of throttle area; however, it will be recognized by one skilled in the art that throttle position is an alternate metric that could be used in place thereof. Next, step 15 represents the determination of the status of the cruise control system. In the system architected as described, the various cruise switch inputs are used in an inferentially based determination of whether cruise control is active. If cruise control is not active, control passes to step 27 whereat the final throttle limit (LIM) is set to Pedal_lim, effectively providing throttle authority to the operator in accordance with the actuated throttle pedal position. An active cruise control system will result in step 15 passing control to step 17 whereat Pedal_lim is compared to the requested cruise throttle area request CRZ_area_req. An additional dead band offset (K) is added to CRZ_area_req for hysteretic stability purposes. Where Pedal_lim is not less than CRZ_area_req, step 27 is executed to set LIM to Pedal_lim, effectively providing throttle authority to the operator in accordance with the actuated throttle pedal position. If, however, Pedal_lim is less than CRZ_area_req, rate limiting is invoked as applied to throttle position changes.

With reference to step 19, rate increment and decrement values, Rate_up and Rate_dn respectively, are set to values in accord with the current engine speed Ne and vehicle speed Nv operating point. The Ne/Nv ratio effects consideration of the current transmission speed ratio and resultant vehicle performance characteristics on setting an appropriate rate limit increment. Step 21 next compares Nv to the cruise vehicle speed request CRZ_Nv_req. Where Nv is less than CRZ_Nv_req, an increasing throttle is expected in accord with the cruise speed control objective of attaining the requested cruise vehicle speed and step 23 is executed. At step 23, LIM is set in accord with the smaller of a limit calculated at a rate corresponding to the rate limit increment Rate_up or the cruise throttle area request. The rate limit is established by adding the prior control loop final limit (LIM_old) to the rate limit increment Rate_up whereas the limit corresponding to the cruise throttle area request is established as CRZ_area_req plus a dead band offset K. In effect, at increasing throttle, LIM substantially tracks the cruise requested throttle up to a predefined rate of requested increase whereat the rate of throttle change is limited at that rate. Control then passes to step 29 which is executed prior to any exit of the routine to set LIM_old to the current limit LIM for use in subsequent control loops.

If at step 21 Nv is not less than CRZ_Nv_req, a decreasing throttle is expected in accord with the cruise speed control objective of attaining the requested cruise vehicle speed and step 25 is executed. At step 25, if the operator has requested through throttle pedal depression a throttle position in excess of that requested by the cruise control, LIM is set to Pedal_lim to effectively provide throttle authority to the operator in accordance with the actuated throttle pedal position. Otherwise, LIM is set in accord with the smaller of a limit calculated at a rate corresponding to the rate limit decrement Rate_dn or the cruise throttle area request. The final rate limit value is established by subtracting the rate limit decrement Rate_dn from the prior control loop final limit (LIM_old) whereas the limit corresponding to the cruise throttle area request is established as CRZ_area_req plus a dead band offset K. In effect, at decreasing throttle, LIM substantially establishes a throttle decrease limit until the cruise requested throttle falls below the limited throttle value whereafter decreasing throttle authority is given to the cruise throttle area request. Control then passes to step 29 which is executed to set LIM_old to the current limit LIM for use in subsequent control loops.

Figure 7:
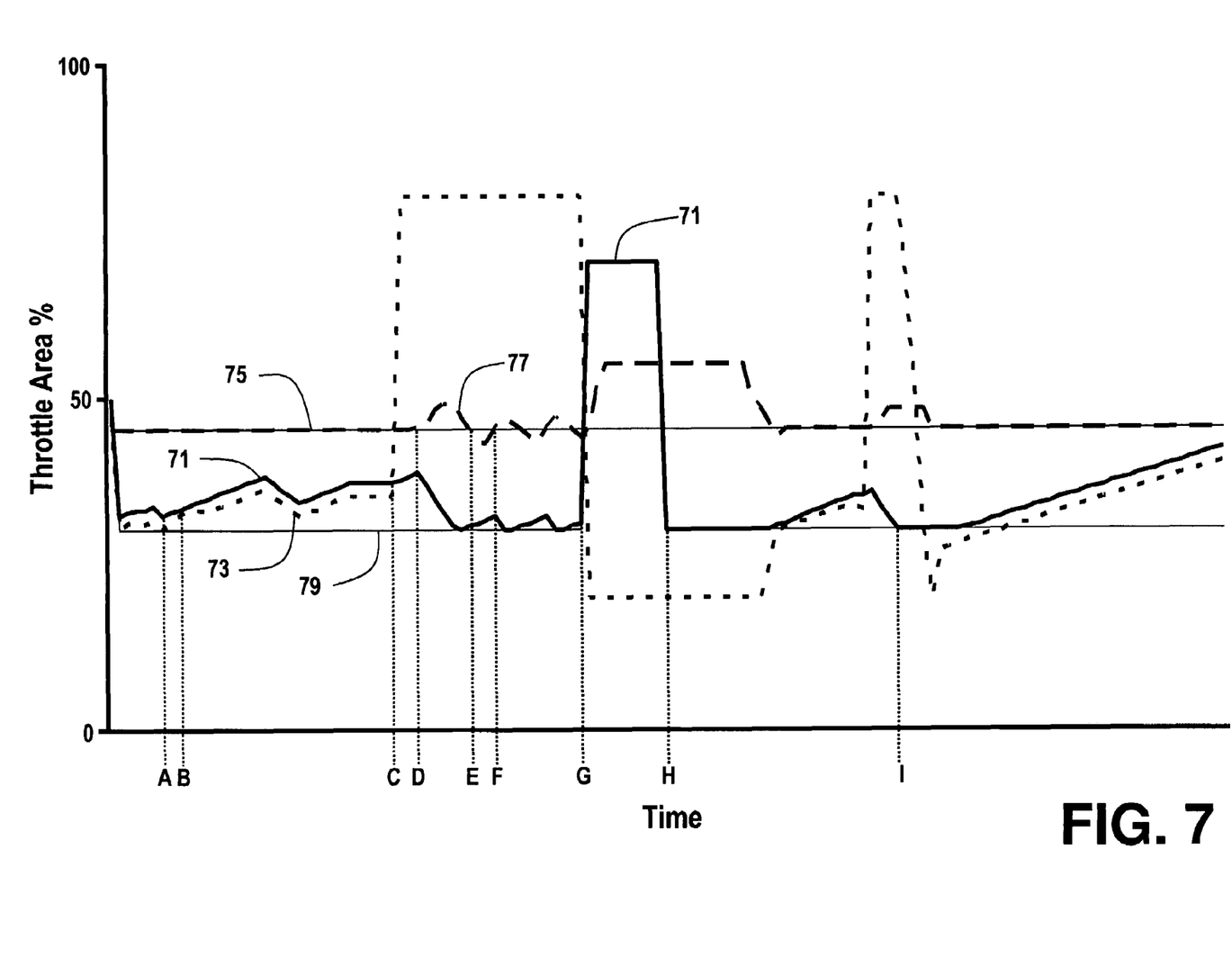
FIG. 7 is a plot of throttle area versus time illustrative of various throttle requests and limits in accordance with the first embodiment of the present invention as represented in FIG. 3.

FIG. 7 illustrates various limit scenarios in accord with the conventional cruise control related embodiment just described with respect to the flow diagram of FIG. 3. In FIG. 7, the line labeled 75 represents the vehicle set speed of the cruise control and line labeled 77 represents actual vehicle speed. These speed lines 75 and 77 are not separately scaled with respect to the vertical axis of the graph as the values thereof are not critical to the present illustration; rather, they are instructive in providing the relative speed error, i.e. difference between set speed 75 and vehicle speed 77 against the same time scale along the horizontal axis of the graph.

Cruise throttle area request, CRZ_area_req, is labeled 73, throttle pedal limit, Pedal_lim, is labeled 79 and the final throttle area limit, LIM, is labeled 71. Various time progressions of the throttle control of the present invention appear as alphabetic labels below the horizontal axis of the graph and will be referred to in the various illustrations herein below.

Beginning with the interval from time A to time B it can be seen that the cruise throttle area request 73 is above the pedal based throttle limit 79 but is increasing substantially at a first rate. This rate, however, is greater than the allowed rate by the limit control and hence the final limit 71 increases at a rate that is less than the requested rate. Since the cruise throttle area request is greater than the pedal based throttle limit, the cruise request has authority and the limit is set in accord therewith. An extreme rate of change in the cruise throttle area request is illustrated (time C). Such excessive changes might be consistent with a corruption in the integrity of the cruise throttle area request due, for example, to a hardware anomaly. However, the limit control of the present invention provides a final throttle rate limit 71 (interval C-D). The throttle responds to the excessive cruise throttle area request at the limited rate and eventually the vehicle speed exceeds the set speed (time D). This condition results in the throttle limit control applying a rate limit having a negative slope to reduce available throttle and attenuate the speed error. Vehicle speed reduces to substantially set speed (time E) and thereafter undershoots the set speed. This condition results in the throttle limit control applying a rate limit having a positive slope to increase available throttle and attenuate the speed error. This process can be seen to repeat while the throttle attempts to respond to the excessive cruise throttle area request 71 (interval C-G). At time G, the pedal based throttle limit 71 step increases significantly such as in response to the operator's request. The cruise throttle area request is shown substantially simultaneously dropping in step fashion even below the former pedal based throttle limit. Here, the throttle limit control of the invention provides a limit that substantially tracks the throttle pedal actuation. At time H, the throttle pedal authority drops stepwise to its former setting such as in response to the operator's request. At this point, the cruise throttle area request 73 is below the pedal based throttle limit and the final limit 71 is established substantially in accord with the pedal based throttle limit. At time I, the cruise throttle area request recovers close to the pedal based throttle limit and then surpasses it. The final limit then increases in accordance with the rate limit.

Figure 4:
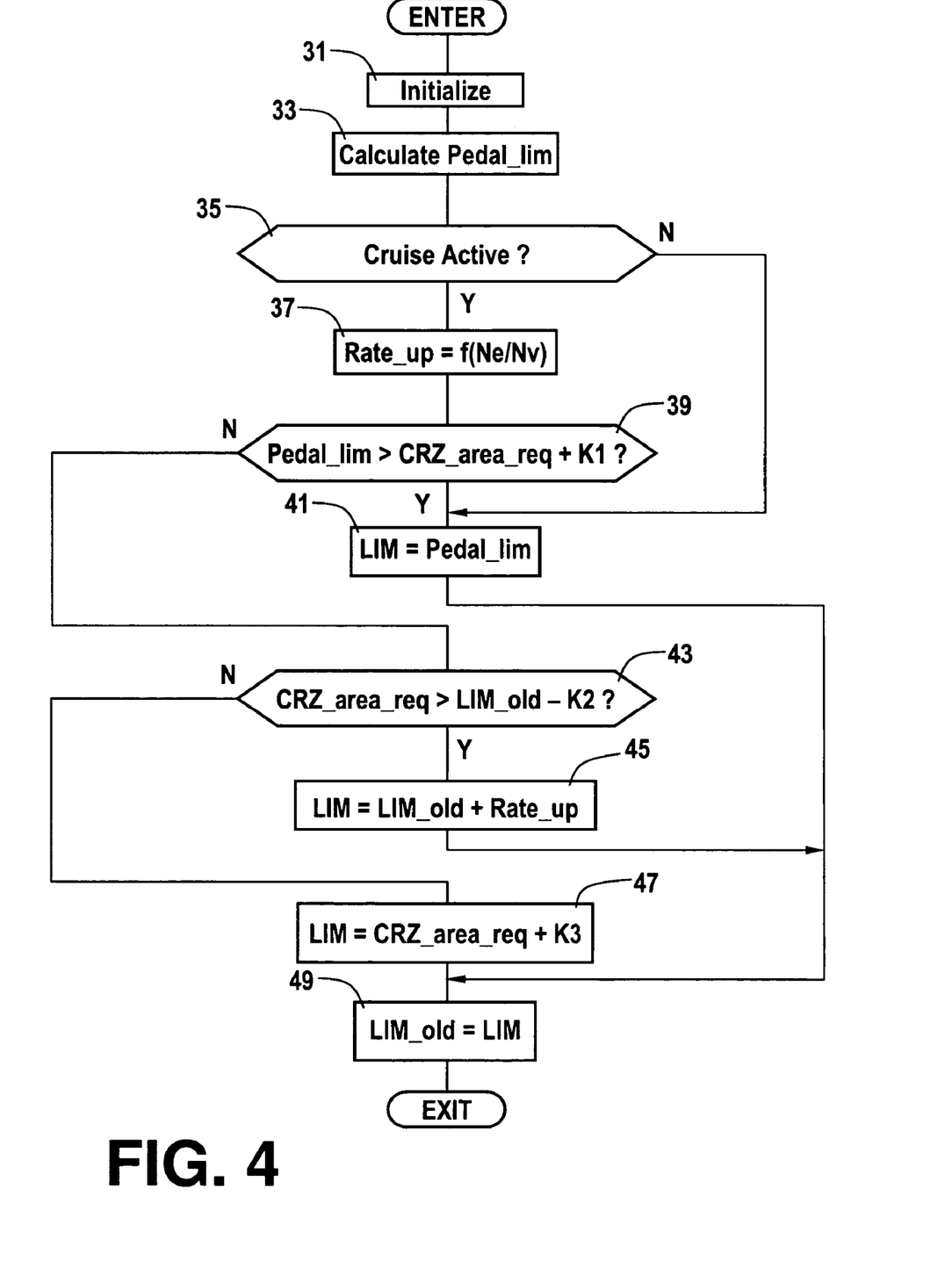
FIG. 4 is a flow diagram representing certain exemplary steps of a second embodiment of the present throttle control invention implemented as part of an automotive adaptive cruise control system.

Turning now to FIG. 4 a routine representing program steps particularly related to the throttle control of the present invention as relates to an adaptive cruise control system effective to control following distance substantially to a set following distance, not to a set speed. Step 31 represents steps executed for the purposes of initializing various registers and variables. Certain of the steps may be executed upon power up only, or through the first interrupt only, for example to seed initial variable values. At step 33 a pedal based throttle limit Pedal_lim is calculated in accordance with the sensed throttle pedal position as invoked by the vehicle operator. Such Pedal_lim essentially follows the operator's actuation of the throttle pedal. The position transduced from the position sensor 26 (FIG. 1) is thereby used to establish Pedal_lim at some finite value in terms of throttle area. Next, step 35 represents the inferential determination of the status of the cruise control system. If cruise control is not active, control passes to step 41 whereat the final throttle limit (LIM) is set to Pedal_lim, effectively providing throttle authority to the operator in accordance with the actuated throttle pedal position. An active cruise control system will result in step 35 passing control to step 37 whereat a rate increment value, Rate_up, is set to a value in accord with the current engine speed Ne and vehicle speed Nv operating point. The Ne/Nv ratio effects consideration of the current transmission speed ratio and resultant vehicle performance characteristics on setting an appropriate rate limit increment. Control passes to step 39 whereat Pedal_lim is compared to the requested cruise throttle area request CRZ_area_req. An additional dead band offset (K1) is added to CRZ_area_req for hysteretic stability purposes. Where Pedal_lim is greater than CRZ_area_req, step 41 is executed to set LIM to Pedal_lim, effectively providing throttle authority to the operator in accordance with the actuated throttle pedal position. From step 41, the routine executes step 49 which is executed prior to any exit of the routine to set LIM_old to the current limit LIM for use in subsequent control loops. If, however, Pedal_lim is not greater than CRZ_area_req, rate limiting is invoked as applied to throttle position changes beginning at step 43.

At step 43, CRZ_area_req is compared to the prior control loop final throttle limit LIM_old less a predetermined dead band offset (K2). If the requested cruise throttle area exceeds the prior limit value then step 45 sets the final throttle limit LIM at a rate corresponding to the rate limit increment Rate_up. The final throttle limit LIM is established by adding the prior control loop final throttle limit LIM_old to the rate limit increment Rate_up. From step 45, the routine executes step 49 to set LIM_old to the current limit LIM for use in subsequent control loops. If at step 43 the requested cruise throttle area does not exceed the prior control loop final throttle limit then step 47 sets the final throttle limit LIM in accord with the cruise throttle area request. The limit corresponding to the cruise throttle area request is established as CRZ_area_req plus a dead band offset (K3). In effect, a cruise throttle area request not greater than the prior control loop final throttle limit indicates a decreasing throttle request at step 43 and provides throttle authority to the cruise throttle area request at step 47. From step 47, the routine executes step 49 to set LIM_old to the current limit LIM for use in subsequent control loops.

Figure 6:
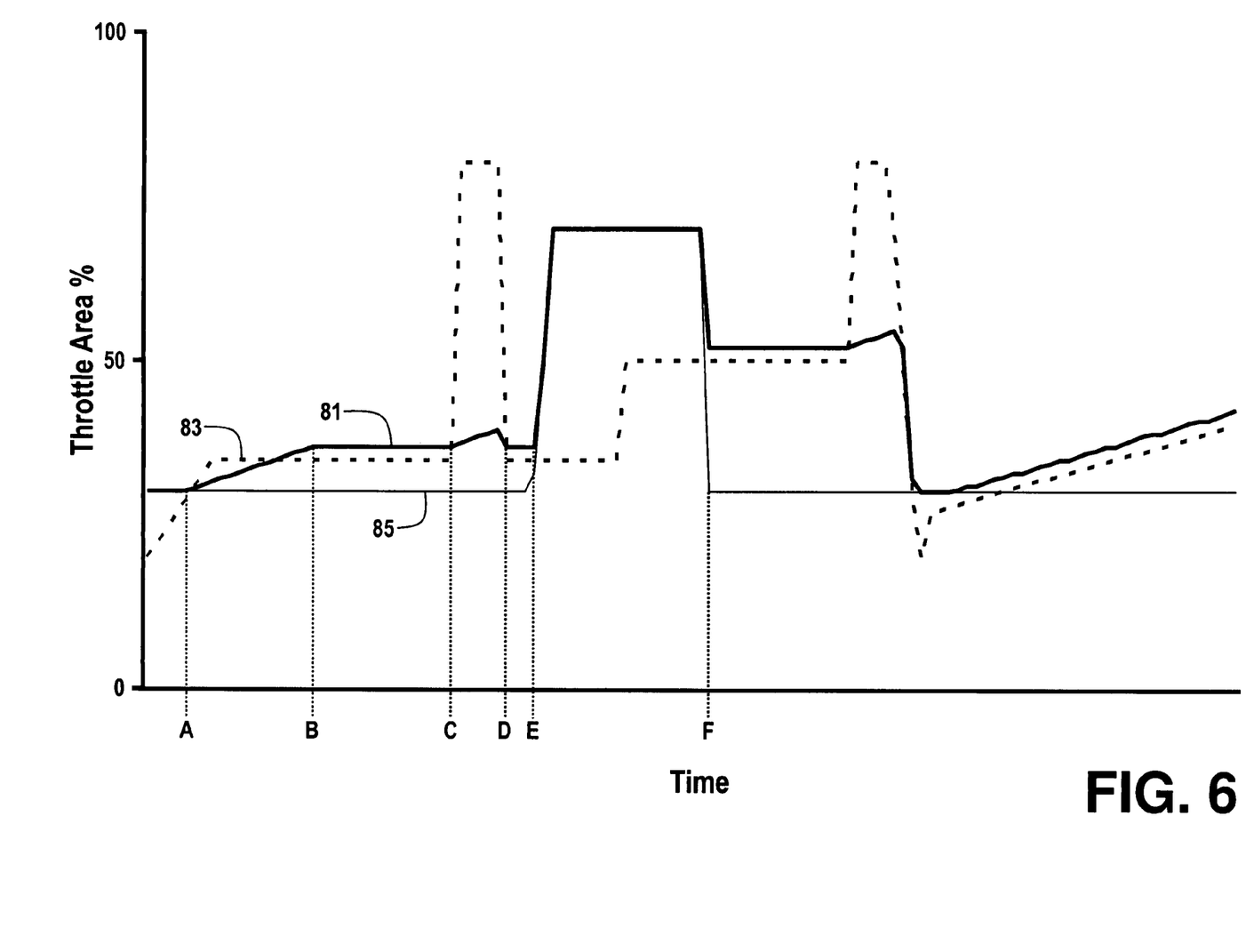
FIG. 6 is a plot of throttle area versus time illustrative of various throttle requests and limits in accordance with the second embodiment of the present invention as represented in FIG. 4.

FIG. 6 illustrates various limit scenarios in accord with the adaptive cruise control related embodiment just described with respect to the flow diagram of FIG. 4. In FIG. 6, the line labeled 83 represents the cruise throttle area request, CRZ_area_req. The line labeled 85 represents the pedal based throttle limit, Pedal_lim and the line labeled 81 represents the final throttle area limit, LIM. Various time progressions of the throttle control of the present invention appear as alphabetic labels below the horizontal axis of the graph and will be referred to in the various illustrations herein below.

Beginning with the interval from time A to time B it can be seen that the cruise throttle area request 83 is substantially above the throttle pedal limit 85 but is increasing substantially at a first rate. This rate, however, is greater than the allowed rate by the limit control and hence the final limit 81 increases at a rate that is less than the requested rate. The cruise throttle area request levels off and the final limit continues to increase at the limited rate until it exceeds the request by the dead band offset whereupon the final limit levels off also. Since the cruise throttle area request is greater than the pedal based throttle limit, the cruise request has authority and the limit is set in accord therewith. An extreme rate of change in the cruise throttle area request is illustrated (time C). Such excessive changes might be consistent with a corruption in the integrity of the cruise throttle area request due, for example, to a hardware anomaly. However, the limit control of the present invention provides a final throttle rate limit 81 (interval C-D). The throttle responds to the excessive cruise throttle area request at the limited rate. At time D the cruise throttle area request returns to substantially its former value prior to the assumed corruption thereof. The final limit immediately tracks the request until it reaches the dead band offset therewith. At time E, the pedal based throttle limit 85 step increases significantly such as in response to the operator's request. Here, the throttle authority is with the pedal based throttle limit and the final limit 81 substantially tracks therewith (interval E-F). In the interim of interval E to F the cruise throttle area request 83 is seen increasing in substantial step wise fashion. But since it remains below the pedal based throttle limit it has substantially no effect in the final limit 81 which continues to be set in accord with the pedal based throttle limit. At time F when the pedal based throttle limit 81 is seen to return to substantially its former value, such as in response to the operator's request, the final limit 81 continues to track the pedal based throttle limit until it comes within the dead band of the now increased cruise throttle area request whereafter the final limit 81 is set in accord with the dead band offset of the substantially static cruise throttle area request 83.

Figure 5:
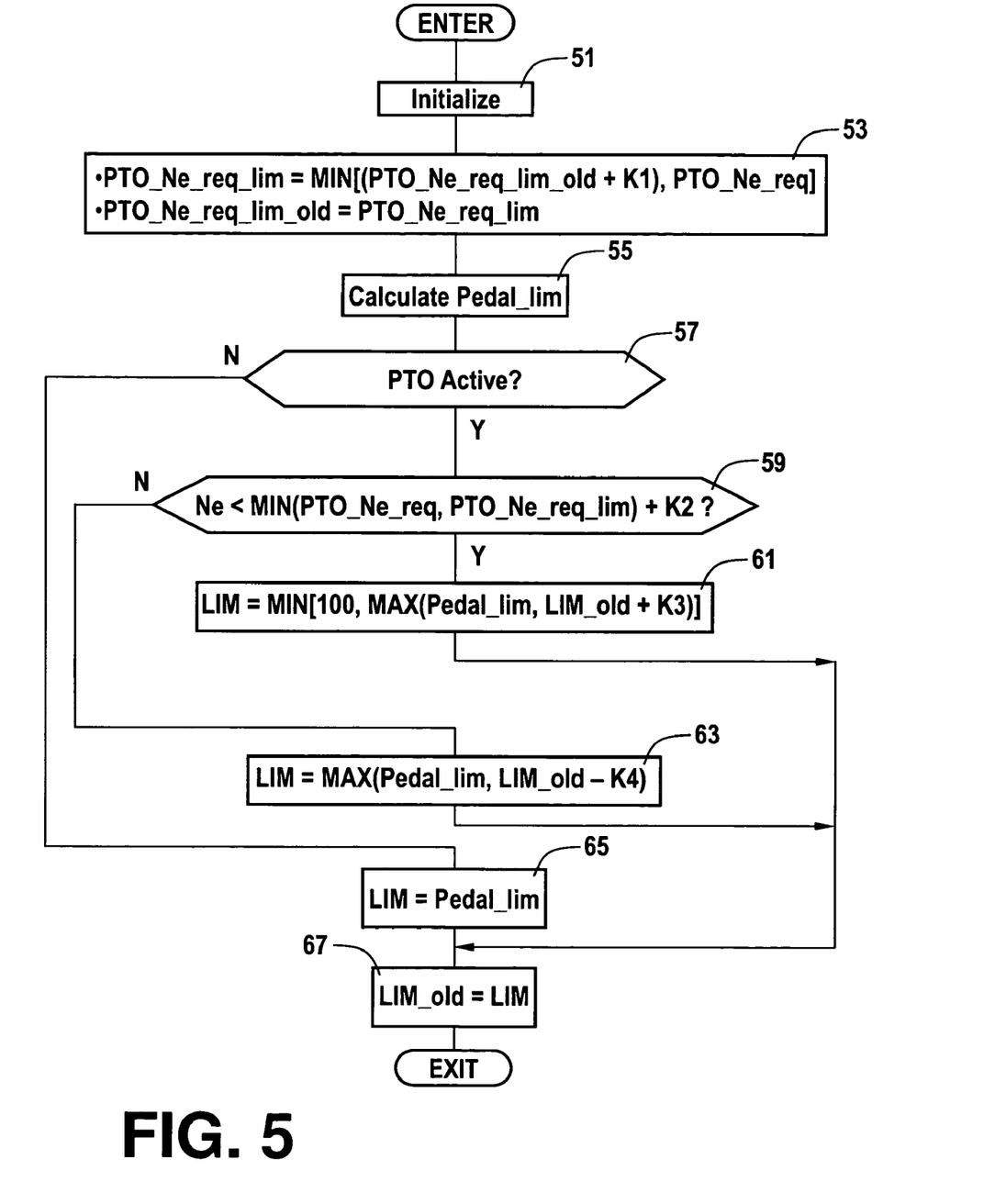
FIG. 5 is a flow diagram representing certain exemplary steps of a third embodiment of the present throttle control invention implemented as part of an automotive power take-off control system.

Turning now to FIG. 5 a routine representing program steps particularly related to the throttle control of the present invention as relates to power take-off control system effective to control engine speed substantially to a set engine speed. Step 51 represents steps executed for the purposes of initializing various registers and variables as in the previously described routines wherein certain of the steps may be executed upon power up only, or through the first interrupt only, for example to seed initial variable values. Step 53 establishes a power take-off engine speed request limit (PTO_Ne_req_lim). The limit is set in accord with the smaller of a limit calculated at a rate corresponding to the calibrated rate limit increment (K1) or the power take-off engine speed request. The limit value is established by adding the prior control loop limit (PTO_Ne_req_lim_old) to the rate limit increment K1 whereas the limit corresponding to the power take-off engine speed request is established as the request (PTO_Ne_req). Essentially, where the power take-off engine speed request is increasing, its increase rate is limited. But where the power take-off engine speed request is decreasing, the engine speed authority is given to the power take-off engine speed request and the limit tracks the request at its rate of decrease. Step 53 of the routine also sets PTO_Ne_req_lim_old to the current limit PTO_Ne_req_lim for use in subsequent control loops. At step 55 a pedal based throttle limit Pedal_lim is calculated in accordance with the sensed throttle pedal position as invoked by the vehicle operator. Such Pedal_lim essentially follows the operator's actuation of the throttle pedal. The position transduced from the position sensor 26 (FIG. 1) is thereby used to establish Pedal_lim at some finite value in terms of throttle area.

Next, step 57 represents the determination of the status of the power take-off system. In the system architected as described, the various power take-off switch inputs are used in an inferentially based determination of whether power take-off control is active. If power take-off control is not active, control passes to step 65 whereat the final throttle limit LIM is set to Pedal_lim, effectively providing throttle authority to the operator in accordance with the actuated throttle pedal position. An active power take-off control system will result in step 57 passing control to step 59 whereat engine speed Ne is compared to the minimum of the power take-off engine speed request limit PTO_Ne_req_lim established at step 53 and the power take-off engine speed request PTO_Ne_req. Comparison to the minimum of these two variables provides protection against corruption of one of them. An additional dead band offset (K2) is added to the minimum of PTO_Ne_req_lim and PTO_Ne_req for hysteretic stability purposes. Where Ne is not less than the minimum of PTO_Ne_req_lim and PTO_Ne_req, step 63 is executed to set LIM in accord with a limit calculated at a rate corresponding to a calibrated rate limit decrement (K4) or Pedal_lim. The rate limit value is established by adding the prior control loop limit (LIM_old) to the rate limit decrement K4. This effectively provides throttle authority to the operator in accordance with the actuated throttle pedal position if it exceeds the prior loop throttle limit and otherwise continuing to rate limit the throttle reductions in accord with the preestablished rate. If, however, Ne is less than the minimum of PTO_Ne_req_lim and PTO_Ne_req, step 61 is executed to set LIM in accord with a limit calculated at a rate corresponding to a calibrated rate limit increment (K3) or Pedal_lim. The rate limit value is established by adding the prior control loop limit (LIM_old) to the rate limit increment K3. This effectively provides throttle authority to the operator in accordance with the actuated throttle pedal position if it exceeds the prior loop throttle limit and otherwise continuing to rate limit the throttle increases in accord with the preestablished rate. Additionally, step 61 places an absolute cap on LIM of 100% throttle should either of Pedal_lim and the rate limit exceed 100%. Prior to exiting the routine, step 67 is executed to set LIM_old to the current limit LIM for use in subsequent control loops.

The various routines described are implemented at a minimum with the MAIN processor section within the TPSR block and applied to the desired throttle position signal which is acted upon by the ETC block in establishing the intake air valve position command signal. Preferably, it is envisioned that the routines are implemented in substantially redundant fashion in MCP processor section as shown in FIG. 36 by throttle limit block TLIM 129 as previously mentioned. TLIM 129 may provide a secondary review of the rationality of intake air valve position command signal provided by ETC 127 and if unacceptable take additional action such as setting diagnostic codes, providing alternative intake air valve position command signals or partially or fully disabling the particular system suspected responsible for the inconsistent results.

Certain preferred embodiments of the present invention have been described herein. Those skilled in the art will recognize various alternative implementations for practicing the invention within the scope of the following claims.

The invention claimed is:

1. Method for controlling throttle change in an internal combustion engine powered vehicle, comprising:
   providing a throttle actuation limit substantially corresponding to an operator selected throttle pedal angle;
   providing a requested throttle actuation corresponding to an automated throttle position control; and
   limiting the rate of change of the throttle when the requested throttle actuation is above said throttle actuation limit.

2. The method as claimed in claim 1 wherein said automated throttle position control comprises a vehicular cruise control.

3. The method as claimed in claim 1 wherein said automated throttle position control comprises a vehicular power take-off control.

4. The method of claim 1 wherein limiting the rate of change of the throttle is effected at a rate substantially corresponding to the smaller of a predetermined rate and the rate of change of the requested throttle actuation.

5. The method of claim 2 wherein the vehicular cruise control comprises controlling the vehicle speed to a set speed and wherein limiting the rate of change of the throttle is effected at a rate substantially corresponding to the smaller of a first predetermined rate and the rate of change of the requested throttle actuation when the vehicle speed is below the set speed and at a rate substantially corresponding to the smaller of a second predetermined rate and the rate of change of the requested throttle actuation when the vehicle speed is above the set speed.

6. The method of claim 5 wherein throttle changes are further limited by the throttle actuation limit when the vehicle speed is above the set speed.

7. The method of claim 1 wherein limiting the rate of change of the throttle is effected at a rate substantially corresponding to the greater of the throttle actuation limit and a predetermined rate.

8. The method of claim 3 wherein the vehicular power take-off control comprises controlling the engine speed to a set speed and wherein limiting, the rate of change of the throttle is effected at a rate substantially corresponding to the greater of the throttle actuation limit and a first predetermined rate when the engine speed is below the set speed and at a rate substantially corresponding to the greater of the throttle actuation limit and a second predetermined rate when the engine speed is above the set speed.

9. The method of claim 3 wherein the vehicular power take-off control comprises controlling the engine speed to a set speed and limiting the rate of change of the set speed.

10. The method of claim 3 wherein the vehicular power take-off control comprises controlling the engine speed to a set speed and limiting the rate of change of the set speed, and wherein limiting the rate of change of the throttle is effected at a rate substantially corresponding to the greater of the throttle actuation limit and a first predetermined rate when the engine speed is below the set speed and at a rate substantially corresponding to the greater of the throttle actuation limit and a second predetermined rate when the engine speed is above the set speed.

11. The method of claim 2 wherein limiting the rate of change of the throttle is effected at a rate established as a function of engine speed and vehicle speed.

12. Method for controlling a throttle in an internal combustion engine, comprising:
providing a first throttle actuation request substantially corresponding to an operator selected throttle pedal angle;
providing a second throttle actuation request corresponding to an automated throttle position control;
effecting throttle changes substantially in accordance with said first throttle actuation request when said first throttle actuation request exceeds said second throttle actuation request; and
rate limiting throttle changes when said first throttle actuation request does not exceed said second throttle actuation request.

13. The method as claimed in claim 12 wherein said automated throttle position control comprises a vehicular cruise control.

14. The method as claimed in claim 12 wherein said automated throttle position control comprises a vehicular power take-off control.

15. The method of claim 12 wherein rate limiting throttle changes is effected at a rate substantially corresponding to the smaller of a predetermined rate and the rate of change of the first second throttle actuation request.

16. The method of claim 13 wherein the vehicular cruise control comprises controlling the vehicle speed to a set speed and wherein rate limiting throttle changes is effected at a rate substantially corresponding to the smaller of a first predetermined rate and the rate of change of the second throttle actuation request when the vehicle speed is below the set speed and at a rate substantially corresponding to the smaller of a second predetermined rate and the rate of change of the second throttle actuation request when the vehicle speed is above the set speed.

17. The method of claim 16 wherein throttle changes are further limited by the first throttle actuation request when the vehicle speed is above the set speed.

18. The method of claim 12 wherein rate limiting throttle changes is effected at a rate substantially corresponding to the greater of the rate of change of the first throttle actuation request and a predetermined rate.

19. The method of claim 14 wherein the vehicular power take-off control comprises controlling the engine speed to a set speed and wherein rate limiting throttle changes is effected at a rate in accordance with the greater of the second throttle actuation request and a first predetermined rate when the engine speed is below the set speed and at a rate in accordance with the greater of the second throttle actuation request and a second predetermined rate when the engine speed is above the set speed.

20. The method of claim 14 wherein the vehicular power take-off control comprises controlling the engine speed to a set speed and limiting the rate of change of the set speed.

21. The method of claim 14 wherein the vehicular power take-off control comprises controlling the engine speed to a set speed and limiting the rate of change of the set speed, and wherein rate limiting throttle changes is effected at a rate in accordance with the greater of the second throttle actuation request and a first predetermined rate when the engine speed is below the set speed and at a rate in accordance with the greater of the second throttle actuation request and a second predetermined rate when the engine speed is above the set speed.

22. The method of claim 13 wherein rate limiting throttle changes is effected at a rate established as a function of engine speed and vehicle speed.

23. The method of claim 4 wherein said predetermined rate is determined as a function of engine speed and vehicle speed.

24. The method of claim 15 wherein said predetermined rate is determined as a function of engine speed and vehicle speed.

* * * * *